United States Patent [19]

Nishimura et al.

[11] Patent Number: 4,546,934
[45] Date of Patent: Oct. 15, 1985

[54] WEBBING TENSION DEVICE

[75] Inventors: Yuji Nishimura; Akinori Fujiwara; Teruhiko Kawaguchi; Toshiaki Shimogawa; Kazuo Sakakibara, all of Aichi, Japan

[73] Assignees: Kabushiki Kaisha Tokai Rika Denki Seisakusho; Nippon Soken, Inc., both of Aichi, Japan

[21] Appl. No.: 633,921

[22] Filed: Jul. 24, 1984

[30] Foreign Application Priority Data

Jul. 29, 1983 [JP] Japan ................. 58-140277

[51] Int. Cl.[4] ............ A62B 35/02; B65H 75/48
[52] U.S. Cl. ............................ 242/107; 280/806
[58] Field of Search ......... 242/107, 107.4 R–107.4 E, 242/107.5; 280/803, 806, 807; 297/475–478

[56] References Cited

U.S. PATENT DOCUMENTS

| 2,883,123 | 4/1959 | Finnigan | 242/107.4 R |
| 3,384,321 | 5/1968 | Becker et al. | 242/107.5 |
| 4,447,017 | 5/1984 | Inukai | 242/107.4 A |
| 4,471,918 | 9/1984 | Ando | 242/107 |

Primary Examiner—John M. Jillions
Attorney, Agent, or Firm—George J. Brandt, Jr.

[57] ABSTRACT

In a webbing tension device adapted for use in a webbing retractor, winding means includes a worm rotated by an occupant and a worm wheel to which a rotative operation force to the worm is subjected to reduction to be transmitted, and a rotation force of the worm wheel is transmitted through clutch means to large resilient means biasing a webbing takeup shaft in a direction of a webbing retraction. Accordingly, after a vehicle is released from an emergency situation, the worm can be rotated against a biasing force of the large resilient means so that the large resilient means is wound up.

20 Claims, 11 Drawing Figures

WEBBING TENSION DEVICE

BACKGROUND OF THE INVENTION

1. Field of the Invention

The present invention relates to a webbing tension device adapted for use in a seatbelt system for protecting an occupant in an emergency situation of a vehicle and more particularly to a webbing tension device imparting a tension to an occupant restraining webbing to closely restrain the occupant with the webbing in the emergency situation of the vehicle.

2. Description of the Prior Art

The seatbelt system is so constructed that the webbing, one end portion thereof being retracted in layers into a webbing retractor, is applied to the occupant and he is closely restrained by the webbing in an emergency situation of the vehicle.

The webbing retractor retracting the webbing therein imparts a predetermined tension to the webbing, but as a retracting force of the webbing retractor is made relatively weak or it is completely removed so as not to give the occupant a sense of oppression, a clearance is formed between the occupant and the webbing restraining the occupant, i.e., the webbing restraining the occupant has a slack. Accordingly, it is thought that in the emergency situation of the vehicle the occupant is moved in a direction of such an accident as a collision by the clearance amount until the occupant is surely restrained by the webbing after an unwinding of the webbing is stopped.

For this reason, a webbing tension device transmitting a biasing force of such resilient means as a spiral spring to a webbing takeup shaft of the webbing retractor, thereby imparting a tension to the webbing in the emergency situation of the vehicle has been proposed in a prior art. In such a device the takeup shaft is biased in a direction of a webbing retraction only by a biasing force of small resilient means in an ordinary running situation of the vehicle, but in the emergency situation of the vehicle a biasing force of large resilient means is transmitted to the takeup shaft, thereby retracting the webbing on the takeup shaft forcibly. However, the biasing force of the large resilient means acting upon the takeup shaft in the emergency situation continues to act thereupon, even after the vehicle is released from the emergency situation, which results in difficulty of operations in release of the webbing from its restraining situation on the occupant and in reuse of the seatbelt system.

SUMMARY OF THE INVENTION

In view of the above fact, the present invention has as its object the provision of a webbing tension device for a webbing retractor in which a biasing force of large resilient means is transmitted to a webbing takeup shaft in an emergency situation of a vehicle but it can be prevented from acting upon the takeup shaft after the vehicle is released from the emergency situation.

In the webbing tension device according to the present invention, winding means includes a worm rotatively operated by an occupant and a worm wheel to which a rotative operation force to the worm is subjected to reduction to be transmitted, and a rotation force of the worm wheel is transmitted to large resilient means through clutch means, whereby after a vehicle is released from an emergency situation the worm is rotatively operated to wind up the large resilient means against a biasing force thereof to return the large resilient means back to its initial situation, so that a webbing retractor can be reused.

Description will hereinunder be given of embodiments with reference to the drawings attached hereto.

PREFERRED EMBODIMENTS OF THE INVENTION

Figure 1:
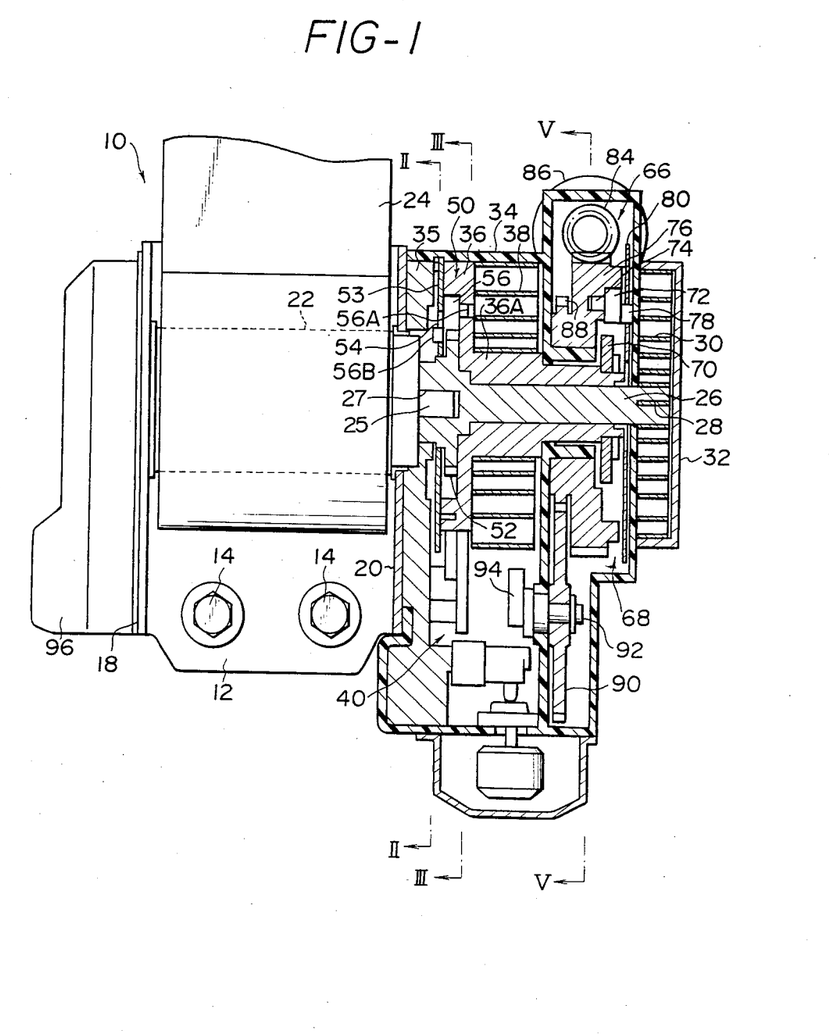
FIG. 1 is a sectional view showing a webbing retractor to which a webbing tension device of a first embodiment according to the present invention is applied.

FIG. 1 shows a first embodiment in which a webbing tension device according to the present invention is assembled integrally into a webbing retractor 10.

The webbing retractor 10 is fixed at its frame 12 to a vehicle body (not shown) through bolts 14. Extended from both side portions of the frame 12 are a pair of leg plates 18 and 20 in parallel with each other, which rotatably support a webbing takeup shaft 22 at its end portions or so. The takeup shaft 22 is secured at its intermediate portion with one end of an occupant restraining webbing 24, and the other end of the webbing 24 is secured with a tongue plate (not shown). The tongue plate is latched to a buckle device (not shown), whereby an occupant can be restrained by the webbing 24 at its intermediate portion. The construction described above is the substantially same as that of a conventional webbing retractor.

One end portion of the takeup shaft 22 is elongated from the leg plate 20 and it is formed with a rectangular axial portion 25 which is received into a rectangular hole 27 of a small diameter rod 26, whereby the small diameter rod 26 and the takeup shaft 22 are connected coaxially to each other. The small diameter rod 26 is formed at its forward end portion with a slit 28 which is secured with an inner end of a small spiral spring 30 which functions as a small resilient means. The small spiral spring 30 is housed in a small spring case 32 and an outer end of the small spiral spring 30 is secured to the small spring case 32. The small spring case 32 is fixed to the leg plate 20 through a case 34 and a sheet 35 closely secured to the leg plate 20. Therefore, the small spiral spring 30 biases the takeup shaft 22 weakly in a direction of a webbing retraction (in a direction of arrow A shown in FIGS. 2 and 3), and when the occupant is restrained by the webbing 24 the small spiral spring 30 causes the webbing 24 to contact softly with the occupant.

Supported rotatably to an outer periphery of the small diameter rod 26 is an operation wheel 36 at its cylindrical portion 36A, so that the operation wheel 36 is rotatable relative to the takeup shaft 22. The cylindrical portion 36A of the operation wheel 36 is secured with an inner end of a large spiral spring 38 which functions as a large resilient means, an outer end thereof being secured to an inner periphery of the case 34. The operation wheel 36 and a gear wheel 70 fixed thereto described later on constitute support means for the large spiral spring 38.

The large spiral spring 38 gives the operation wheel 36 larger biasing force than the small spiral spring 30. However, the operation wheel 36 is prevented from rotation in a direction of a webbing retraction by trigger means 40 in an ordinary running situation of the vehicle, and only in an emergency situation of the vehicle the operation wheel 36 is rotatable in the direction of the webbing retraction.

Figure 3:
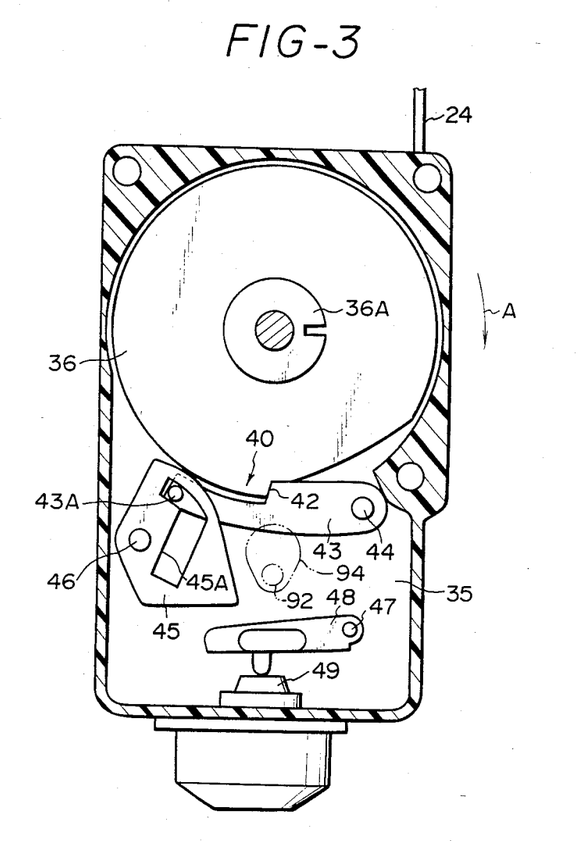
FIG. 3 is a sectional view taken along a line III—II of FIG. 1.
Figure 4:
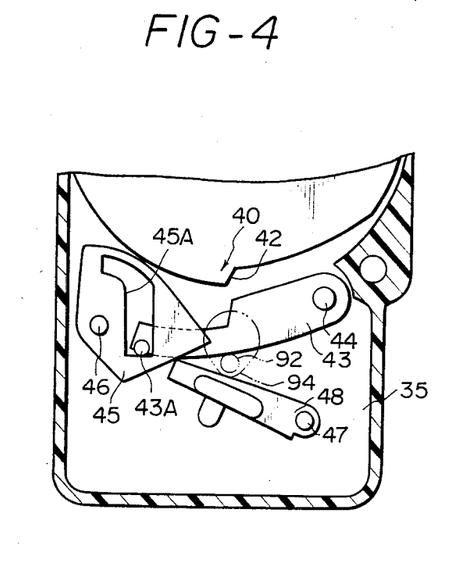
FIG. 4 is an operational view of FIG. 3.

As is shown in FIGS. 3 and 4, in the trigger means 40 a pawl 43 latched to a cutout 42 of the operation wheel 36 is rotatably supported to the case 34 through a pin 44, and the pawl 43 is subjected to a control of a cam 45 to be separated from the operation wheel 36 in the emergency situation of the vehicle. That is to say, the cam 45 is rotatably supported to the case 34 through a pin 46 and a pin 43A of the pawl 43 is received in an L-shaped groove 45A of the cam 45. The cam 45 is opposed to a sensor lever 48 rotatably supported to the sheet 35 through a pin 47, preferably the cam 45 and the sensor lever 48 being slightly separated from each other, and the sensor lever 48 is disposed on a pendulum 49 hung from the sheet 35.

As shown in FIG. 3, the cam 45 is disposed such that an arc-shaped portion of the L-shaped groove 45A formed in its one side centering around the pin 46 is situated in a direction of a tangential line of the operation wheel 36 and the arc-shaped portion receives the pin 43A therein in the ordinary running situation of the vehicle. Accordingly, the pawl 43 is maintained in its latching situation to the operation wheel 36 in the ordinary situation of the vehicle. In the emergency situation of the vehicle, however, when the pendulum 49 which functions as an acceleration sensor detects an abnormal change of an acceleration of the vehicle to be swung so that the sensor lever 48 is pushed up, the cam 45 is rotatively moved such that the other side of the L-shaped groove 45A communicating with the arc-shaped portion is situated in the tangential line of the operation wheel 36, i.e., the pin 43A is positioned in the other side of the L-shaped groove 45A, whereby the pawl 43 is put into its releasable situation from the operation wheel 36.

In this connection, the pawl 43 is being subjected to a weak biasing force of resilient means (not shown) in a direction of approach to the operation wheel 36 and it is latched to the cutout 42 of the operation wheel 36. Also, the sensor lever 48 is preferably provided with a snap action mechanism whereby when the sensor lever 48 is pushed up slightly by the pendulum 49 to pass a predetermined boundary point rotatingly, it is rapidly rotated upwardly.

Disposed between the operation wheel 36 and the takeup shaft 22 is clutch means 50, whereby the operation wheel 36 and the takeup shaft 22 are separated from each other in the ordinary running situation of the vehicle but a rotation of the operation wheel 36 is transmitted to the takeup shaft 22 only in the emergency situation of the vehicle.

Figure 2:
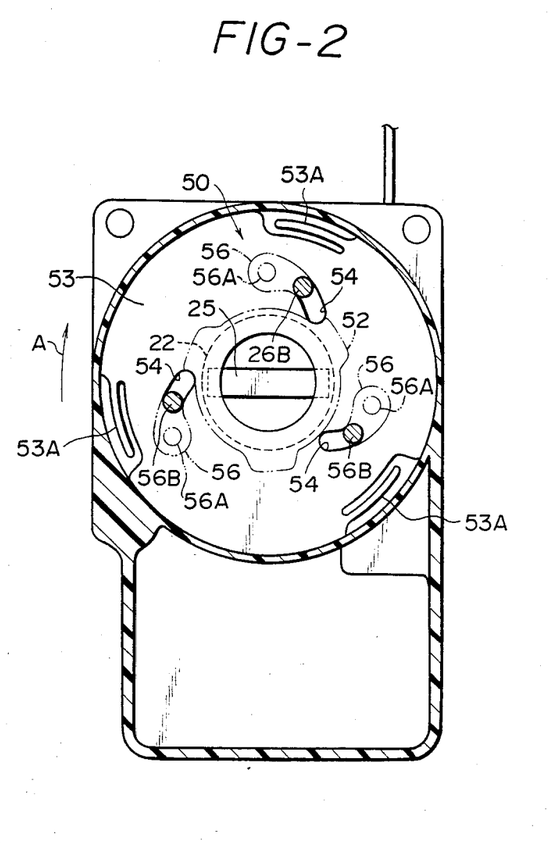
FIG. 2 is a sectional view taken along a line II—II of FIG. 1.

In the clutch means 50, the small diameter rod 26 connected to the takeup shaft 22 is fixed at an outer periphery of an end portion thereof with a gear wheel 52 which is formed at its outer periphery with a plurality of convexo-concave portions. Also, the outer periphery of the gear wheel 52 is opposed to a friction plate 53 which is a clutch plate, and levers 56 guided along guide hole 54 formed on the friction plate 53 are engaged with the gear wheel 52.

Particularly speaking, the friction plate 53 is rotatably supported on the small diameter rod 26 coaxially with the takeup shaft 22 and it is formed at portions of an outer periphery thereof with arms 53A. The arms 53A are forced to contact with the sheet 35, so that the friction plate 53 is subjected to frictional resistance from the sheet 35 at a time of rotation of the friction plate 53. In addition, each of the levers 56 is formed at its base portion with a pin 56A which is received in each of circular holes formed on the operation wheel 36 and is rotatably supported thereby.

Furthermore, each of the levers 56 is formed at its forward end portion with another pin 56B projected in a reverse direction to the pin 56A, and the pin 56B is received in the guide hole 54 of the friction plate 53.

As shown in FIG. 2, the friction plate 53 positions the pin 56B to an outermost end portion of the guide hole 54 to separate it from the gear wheel 52 in the ordinary running situation of the vehicle. In an emergency situation of the vehicle, however, when the operation wheel 36 is rotated, the friction plate 53 guides the pin 56B along the guide hole 54. As a result, the pin 56B is caused to engage with the gear wheel 52 and a rotation force of the operation wheel 36 is transmitted to the lever 56 as a compression force, whereby the gear wheel 52 is rotated in the direction of the webbing retraction.

Figure 5:
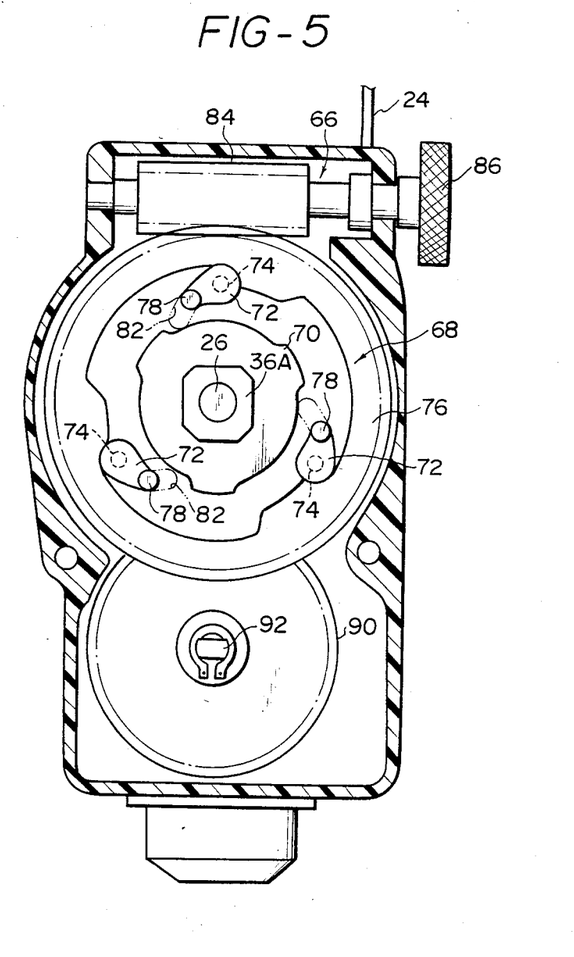
FIG. 5 is a sectional view taken along a line V—V of FIG. 1.
Figure 6:
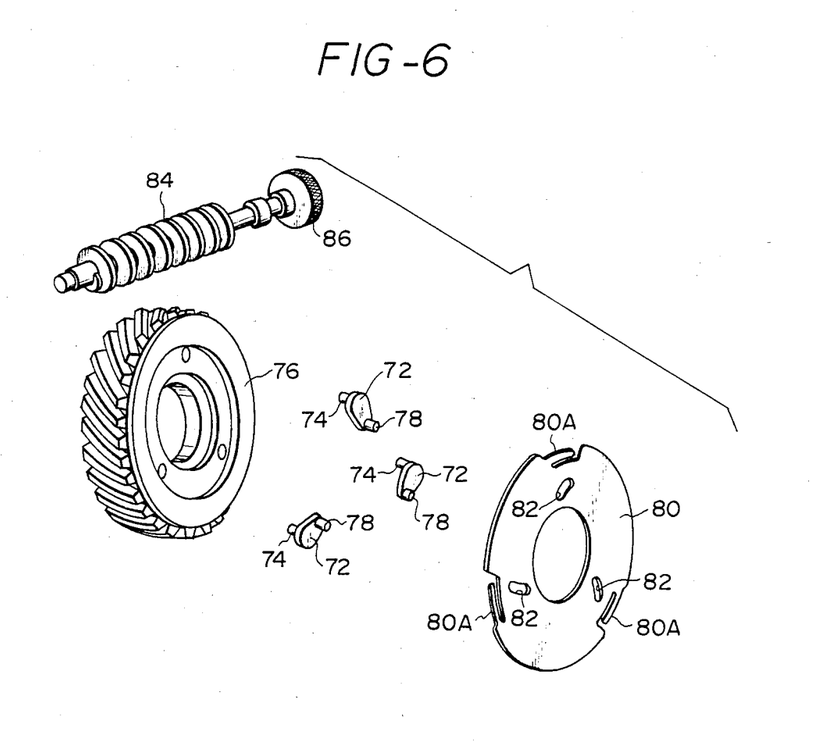
FIG. 6 is a disassembled perspective view of winding means and clutch means.

In the case 34, disposed between the large spiral spring 38 and the small spiral spring 30 are winding means 66 and clutch means 68. As shown in FIG. 5, fixed to the cylindrical portion 36A of the operation wheel 36 is the gear wheel 70 which is opposed to three levers 72. Each of the levers 72 is projectingly formed at its base portion with a pin 74 rotatably supported to a worm wheel 76 and it is also formed at its forward end portion with a pin 78 projected in a reverse direction to the pin 74, the pin 78 being caused to engaged with an outer periphery of the gear wheel 70.

Also, the pin 78 is opposed to a guide hole 82 of a friction plate 80 disposed coaxially with the operation wheel 36. The friction plate 80 which functions as a clutch plate has a similar configuration to the friction plate 53 of the clutch means 50 and it is formed at its outer periphery portion with arms 80A which contact with the case 34, so that frictional forces occur between the arms 80A and the case 34. The friction plate 80 is formed with guide holes 82 which guide the pins 78 to cause the pins 78 to engage with the gear wheel 70 when the worm wheel 76 is rotated. After the pins 78 are engaged with the gear wheel 70, the gear wheel 70 is rotated together with the worm wheel 76. Accordingly, the levers 72 and the friction plate 80 constitutes the clutch means 68.

As is shown in FIG. 5, the worm wheel 76 is engaged with a worm 84 which is rotatably supported to the case 34. One end portion of the worm 84 is elongated from the case 34 and is fixed with an operation dial 86. Therefore, when the operation dial 86 is rotatively operated by the occupant, the worm wheel 76 is rotated through the worm 84 and the operation wheel 36 is also rotated through the clutch means 68.

The worm wheel 76 is integrally fixed at its portion with a pinion 88 which is engaged with a toothed wheel 90 rotatably supported to the case 34. The toothed wheel 90 is fixed thereto with a cam rod 92, a forward end portion thereof being fixed thereto with an oval cam 94. The oval cam 94 is opposed to the sensor lever 48, and when the worm wheel 76 is rotated in such a condition that the cam 45 has been rotated by the sensor lever 48, as shown in FIG. 4, the sensor lever 48 is forcibly pushed down by a rotation force of the worm wheel 76, so that the sensor lever 48 is returned back to a position shown in FIG. 3.

The other end portion of the takeup shaft 22 elongated from the leg plate 18 is provided at an outside of the leg plate 18 with an inertial locking mechanism 96, a detailed description thereof being omitted, whereby the takeup shaft 22 is prevented from rotation in a direction of a webbing unwinding in the emergency situation of the vehicle.

Description will now be given of operation of the first embodiment constructed in the above manner.

The occupant is capable of unwinding the webbing 24 from the takeup shaft 22 and of restraining himself by the webbing 24. When the occupant is restrained by the webbing 24, the webbing 24 is caused to contact with the occupant softly since the biasing force of the small spiral spring 30 always acts upon the takeup shaft 22 weakly in the direction of the webbing retraction. In the ordinary running situation of the vehicle, the inertial locking mechanism 96 is not worked, so that the occupant can change his attitude voluntarily.

When the vehicle is in an emergency situation as a collision, the pendulum 49 is swung to push up the sensor lever 48. Accordingly, the cam 45 is rotated and the pawl 43 is pushed down by the operation wheel 36 to be separated from the operation wheel 36. As a result, the operation wheel 36 is rotated in the direction of the webbing retraction by the biasing force of the large spiral spring 38.

In addition, the levers 56 are rotated in accordance with the rotation of the operation wheel 36 and they are guided along the guide holes 54 of the friction plate 53 subjected to a rotation resistance from the sheet 35 through the arm 53A to be engaged with the gear wheel 52. Consequently, the operation wheel 36 is connected to the gear wheel 52, so that the biasing force of the large spiral spring 38 acts upon the takeup shaft 22. In this connection, after the operation wheel 36 and the gear wheel 52 are connected to each other, the friction plate 53 is also rotated together with the operation wheel 36.

While the operation wheel 36 is being rotated in this manner, the worm wheel 76 is separated from the operation wheel 36 by the clutch means 68 and, therefore, the winding means 66 does not prevent the operation wheel 36 from the rotation.

As a result, the takeup shaft 22 retracts the webbing 24 thereon to impart a tension to the webbing 24, whereby a clearance between the occupant and the webbing 24, i.e., a slack of the webbing 24, is removed, or cancelled. Simultaneously therewith, the inertial locking mechanism 96 stops the rotation of the takeup shaft 22 in a direction of a webbing unwinding instantaneously, so that the occupant is closely restrained by the webbing 24 and he is kept in a security situation.

After the vehicle is released from the emergency situation, the occupant rotates the operation dial 86. The rotation of the operation dial 86 is transmitted to the worm wheel 76 through the worm 84, so that the worm wheel 76 is rotated. In accordance with the rotation of the worm wheel 76 the friction plate 80 guides the pins 78 of the levers 72 along the guide holes 82 in a direction of the gear wheel 70 and the pins 78 are caused to engage with the gear wheel 70.

When the operation dial 86 is rotated by the occupant, the gear wheel 70 is rotated by the worm wheel 76 through the pins 78 and the operation wheel 36 fixed to the gear wheel 70 is rotated against the biasing force of the large spiral spring 38. In this case, the friction plate 80 is also rotated simultaneously. The biasing force of the large spiral spring 38 is relatively large, but an operation force of the occupant given to the operation dial 84 is subjected to reduction by a combination of the worm wheel 76 and the worm 84, whereby the operation wheel 36 can be rotated, or the large spiral spring 38 can be wound up by a small operation force of the occupant. When the operation wheel 36 is rotated by a predetermined angle, the pawl 43 is engaged with the cutout 42 of the operation wheel 36 by a biasing force of the resilient means (not shown), so that the operation wheel 36 is returned back to its initial situation, that is, the winding up of the large spiral spring 38 is accomplished. Simultaneously therewith, the oval cam 94 is subjected to the rotation force of the worm wheel 76 through the toothed wheel 90 and the pinion 88 and the sensor lever 48 is pushed up by the oval cam 94 to be returned back to the situation shown in FIG. 3. Also, the cam 45 is rotated about the pin 46 by its self-weight to be returned back to the situation shown in FIG. 3.

Thus, the webbing retractor 10 is returned back to its initial condition, whereby the webbing 24 can be released from its restraining situation about the occupant and it can be reused, in which the webbing 24 can be put in its closely restraining situation on the occupant in next emergency situation of the vehicle.

FIGS. 7 through 11 show a webbing retractor 100 of a second embodiment according to the present invention.

Figure 7:
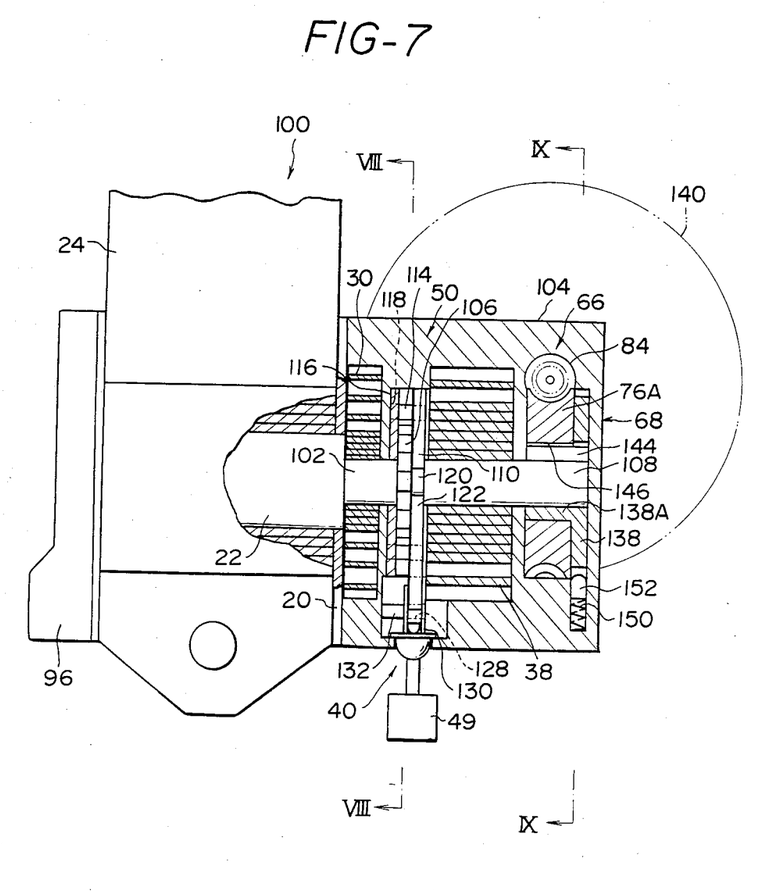
FIG. 7 is a sectional view showing a second embodiment according to the present invention.

In the webbing retractor 100, elongated from the leg plate 20 is a small diameter portion 102 of the takeup shaft 22 to which the inner end of the small spiral spring 30 is secured. The outer end of the small spiral spring 30 is secured to the leg plate 20 through a cover 104. The small diameter portion 102 is fixed at its end portion with a ratchet wheel 106 and it is opposed to a flange 110 of a turn rod 108 disposed coaxially with the ratchet wheel 106.

Figure 10:
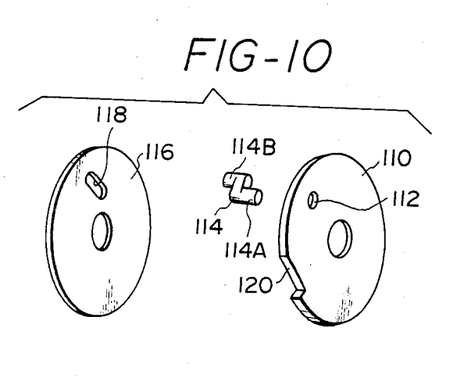
FIG. 10 is a perspective view showing a flange and a friction plate.

The flange 110 and the ratchet wheel 106 constitutes a main portion of the clutch means 50. As shown in FIG. 10, the flange 110 is formed with a circular hole 112 into which one axial portion 114A of a clutch pin 114 is received, so that the clutch pin 114 is rotatable centering around the one axial portion 114A.

The other axial portion 114B of the clutch pin 114 is received in a guide hole 118 formed on a friction plate 116. The friction plate 116 is rotatably supported by the small diameter portion 102, and it is caused to abut on a side face of the cover 104 to be subjected to a frictional resistance when it is rotated.

Figure 8:
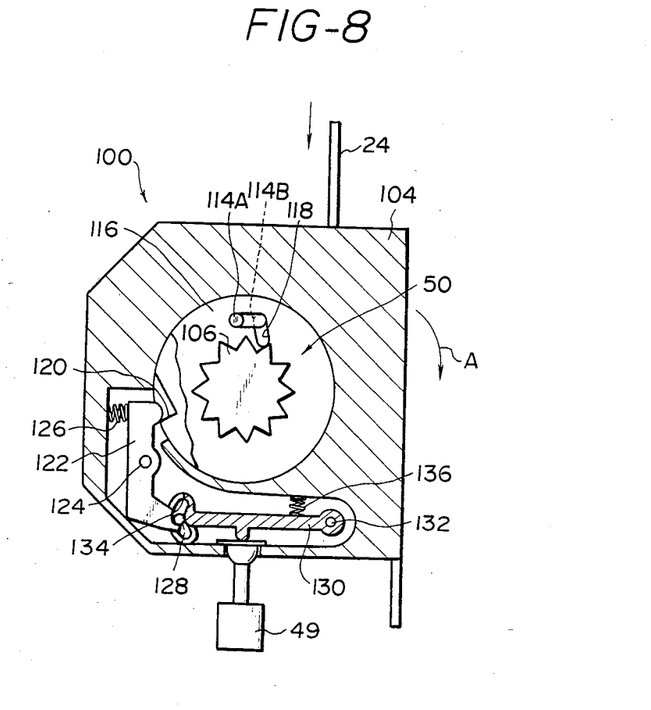
FIG. 8 is a sectional view taken along a line VIII—VIII of FIG. 7.

Accordingly, when the flange 110 is rotated in a direction of arrow A shown in FIG. 8, the other axial portion 114B of the clutch pin 114 is guided along the guide hole 118 to be moved in a direction of a rotation center, so that it is engaged with the ratchet wheel 106. After the other axial portion 114B is engaged with the ratchet wheel 106, the friction plate 116 is rotated together with the small diameter portion 102.

The flange 110 is formed with a cutout 120, as shown in FIGS. 8 and 10, and the cutout 120 is engaged with a pawl 122. That is to say, the pawl 122 is rotatably supported at its center portion to the cover 104 through a pin 124 and it is engaged at its one end portion with the cutout 120 by a biasing force of a compression coil spring 126 confined between the pawl 126 and the cover 104. Accordingly, the turn rod 108 is subjected to a large biasing force of the large spiral spring 38 confined between the cover 104 and the turn rod 108 but it is prevented from rotation.

The pawl 122 is secured at the other end portion to a sensor lever 130 through a pin 128. That is to say, one end portion of the sensor lever 130 is pivoted to the cover 104 through a pin 132 and the other end portion thereof is formed in a branch shape. The other end portion of the pawl 122 is received in the branch portion of the sensor lever 130 and the branch portion is formed with a hole 134 in which the pin 128 is received.

Confined between the sensor lever 130 and the cover 104 is a compression coil spring 136 which biases the sensor lever 130 in a direction of the pendulum 49. Accordingly, in the condition shown in FIG. 8 the pawl 122 is not rotated in a counterclockwise direction, but in the emergency situation of the vehicle the sensor lever 130 is pushed up by the pendulum 49 and the pawl 122 is released from its engaging situation with the pin 128, so that the pawl 122 is rotated in the counterclockwise direction and the flange 110 is put in its rotatable situation.

A face of the pawl 122 abutting on the pin 128 is formed in an arc shape centering around the pin 132 and a face of an inner periphery of the hole 134 abutting on the pin 128 is also formed in a similar arc shape to the pawl 122. In the condition shown in FIG. 8, therefore, a force rotating the pawl 122 in the counterclockwise direction is directed to the pin 132, which results in prevention from an unnecessary rotation of the pawl 122.

Figure 9:
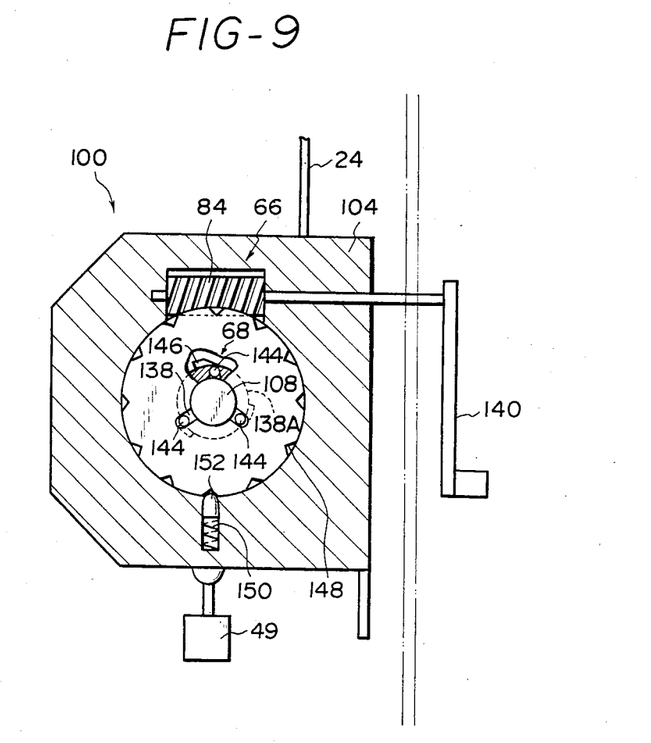
FIG. 9 is a sectional view taken along a line IX—IX of FIG. 7.
Figure 11:
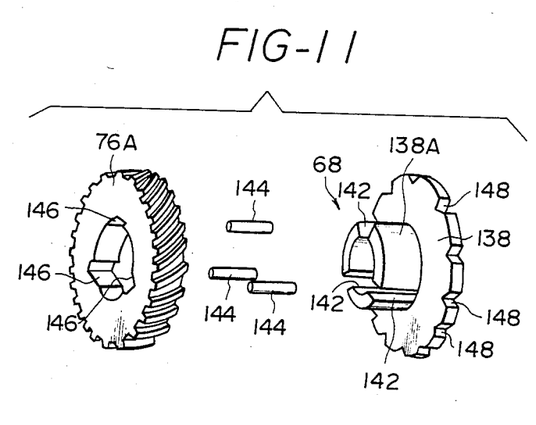
FIG. 11 is a perspective view showing a worm wheel and a retainer.

A forward end portion of the turn rod 108 is received in a retainer 138, as shown in FIGS. 9 and 11. Supported rotatably to a boss portion 138A of the retainer 138 at its outer periphery is a worm wheel 76A which is engaged with the worm 84 rotatably supported to the cover 104. Thus, the worm wheel 76A and the worm 84 constitute the winding means 66 as well as the first embodiment. The worm 84 is provided with a handle 140 for operation of the occupant.

The boss portion 138A of the retainer 138 is formed in its axial direction with a plurality of slits 142 (three in this embodiment), as shown in detail in FIG. 11, and each of the slits 142 receives a pin 144 therein. Accordingly, when the retainer 138 is rotated, the respective pins 144 are rotated about the turn rod 108.

The worm wheel 76A is formed at its inner periphery with serration grooves 146 opposed to the respective pins 144, whereby the clutch means 68 is constituted. When the worm wheel 76A is rotated in a counterclockwise direction in FIG. 9, the serration grooves 146 pushes the pins 144 onto the turn rod 108 to connect the worm wheel 76A to the turn rod 108, but when the worm wheel 76A is rotated in a clockwise direction in FIG. 9, the pins 144 are made movable in a radial direction of the turn rod 108, whereby the worm wheel 76A is released from the connection with the turn rod 108.

The retainer 138 is formed at its outer periphery with a plurality of concave grooves 148 at regular intervals and the concave grooves 148 receive a pin 152 supported on the cover 104 through a compression coil spring 150, whereby the retainer 138 is subjected to a rotation resistance when it is rotated.

Description will now be given of operation of the second embodiment thus constructed.

In the ordinary running situation of the vehicle, as the ratchet wheel 106 is separated from the clutch pin 114, the takeup shaft 22 is rotatable and, therefore, the occupant can change his attitude voluntarily.

When the vehicle is in an emergency situation as a collision, the sensor lever 130 is pushed up by the pendulumn 49 and the pawl 122 is released from its engaging situation with the pin 128, so that the pawl 122 is rotated in the counterclockwise direction in FIG. 8. As a result, the flange 110 is made rotatable, and it is rotated in a clockwise direction in FIG. 8 by the large biasing force of the large spiral spring 38, the other axial portion 114B of the clutch pin 114 rotated together with the flange 110 is guided along the guide hole 118 of the friction plate 116 to be engaged with the ratchet wheel 106. Therefore, the biasing force of the large spiral spring 38 acts upon the takeup shaft 22, so that the occupant is restrained closely by the webbing 24.

As described above, while the takeup shaft 22 is being rotated, the worm wheel 76A is separated from the takeup shaft 22 through the clutch means 68 and, therefore, the winding means 66 does not prevent the takeup shaft 22 from rotation. Simultaneously therewith, the inertial locking mechanism 96 stops the unwinding rotation of the takeup shaft 22 instantaneously, so that the occupant can be maintained in his restrained situation by the webbing 24.

Upon termination of the vehicle emergency situation, the handle 140 can be rotated by the occupant so that the large spiral spring 38 is wound up, while he is either in the restrained situation or after he is released from the restrained situation. That is to say, in accordance with the rotation of the handle 140 the worm wheel 76A is rotated by the worm 84. In accordance with the rotation of the worm wheel 76A the pins 144 are pushed to the turn rod 108 by the serration grooves 146 and the clutch means 68 is placed in its connected situation, whereby the large spiral spring 38 is wound up and thereafter the cutout 120 is engaged with the pawl 122. Thus, the winding-up of the large spiral spring 38 is completed.

In this case, as the clutch pin 114 is rotated relative to the ratchet wheel 106 in a counterclockwise direction of FIG. 8, the clutch means 50 is not put in its connected situation.

After the winding-up of the large spiral spring 38 is accomplished, the connection of the worm wheel 76A and the turn rod 108 through the pins 144 is cancelled when the handle 140 is rotated in a reverse direction, whereby the clutch means 68 is returned back to its initial situation, namely, its disconnected situation. Also, the turn rod 108 and the retainer 138 are not connected to each other unnecessarily since the pins 144 are prevented from rotating about the turn rod 108 by the retainer 138.

What is claimed is:

1. A webbing tension device adapted for use in a webbing retractor for protecting an occupant in an emergency situation of a vehicle, which comprises:
   (a) first resilient means biasing a webbing takeup shaft supported rotatably to the webbing retractor and secured thereto with one end of an occupant restraining webbing in a direction of a webbing retraction,
   (b) second resilient means biasing the takeup shaft in the direction of the webbing retraction in the emergency situation of the vehicle, a biasing force of the second resilient means being larger than that of the first resilient means;
   (c) winding means including a worm wheel disposed coaxially with the takeup shaft and rotatable relative to the takeup shaft and a worm engaged with the worm wheel to rotate the worm wheel under reduction; and
   (d) first clutch means transmitting a rotation of the worm wheel to the second resilient means against the biasing force thereof when the worm is rotated, whereby the second resilient means is wound up.

2. A webbing tension device as set forth in claim 1. which further comprises trigger means actuating the second resilient means in the emergency situation of the vehicle and preventing the worm from being further rotated when the winding-up of the second resilient means is accomplished.

3. A webbing tension device as set forth in claim 2, which further comprises second clutch means transmitting the biasing force of the second resilient means to the takeup shaft to rotate it in the direction of the webbing retraction in the emergency situation of the vehicle, whereby a tension is imparted to the webbing.

4. A webbing tension device as set forth in claim 3, wherein the worm is provided with operation means rotatively operated by the occupant.

5. A webbing tension device as set forth in claim 4, wherein the first clutch means includes first lever means rotatably supported to the worm wheel and a first clutch plate disposed coaxially with the worm wheel and guiding the first lever to cause it to engage with support means supporting one end of the second resilient means when the worm wheel is rotated by the worm, whereby a rotation force of the worm is transmitted to the one end of the second resilient means through the worm wheel, the first clutch means and the support means, so that the second resilient means is wound up.

6. A webbing tension device as set forth in claim 5, wherein the support means includes an operation wheel disposed coaxially with the takeup shaft and rotatably relative thereto and a first gear wheel fixed coaxially to the operation wheel, and the lever means is engaged with the gear wheel when the worm wheel is rotated by the worm.

7. A webbing tension device as set forth in claim 6, wherein the trigger means includes an acceleration sensor actuated in the emergency situation of the vehicle and a pawl put in its engaging situation with the operation wheel in an ordinary situation of the vehicle and released from the operation wheel when the acceleration sensor is actuated in the emergency situation of the vehicle, whereby the second resilient means is actuated in the emergency situation of the vehicle.

8. A webbing tension device as set forth in claim 7, wherein the second clutch means includes second lever means rotatably supported to the operation wheel and a second clutch plate disposed coaxially with the operation wheel and guiding the second lever means to cause it to engage with a second gear wheel fixed to shaft in the emergency situation of the vehicle, whereby the biasing force of the second resilient means is transmitted to the takeup shaft in the emergency situation of the vehicle, so that the tension is imparted to the webbing.

9. A webbing tension device as set forth in claim 8, wherein cam means is disposed between the worm wheel and the trigger means, the cam means is rotated in accordance with a rotation of the worm wheel, and the cam means causes the pawl to engage with the operation wheel when the operation is rotated by a predetermined angle, whereby the winding-up of the second resilient means is accomplished.

10. A webbing tension device as set forth in claim 4, wherein the first clutch means includes a pin received in a retainer disposed coaxially with the worm wheel and a serration groove formed opposite to the pin on an inner periphery of the worm wheel, a turn rod supporting one end of the second resilient means is disposed coaxially with the takeup shaft, and the worm wheel is connected to the turn rod through the pin and the serration groove when the worm wheel is rotated in one direction by the worm, whereby the second resilient means is wound up.

11. A webbing tension device as set forth in claim 10, wherein the second clutch means includes a clutch pin rotatably supported to a flange of the turn rod and a clutch plate disposed coaxially with the turn rod and guiding the clutch pin to cause it engage with a ratchet wheel fixed coaxially to the takeup shaft in the emergency situation of the vehicle, whereby the biasing force of the second resilient means is transmitted to the takeup shaft in the emergency situation of the vehicle.

12. A webbing tension device as set forth in claim 11, wherein the trigger means includes an acceleration sensor actuated in the emergency situation of the vehicle, a pawl put in its engaging situation with the flange of the turn rod in an ordinary situation of the vehicle and released from the flange when the acceleration sensor is actuated in the emergency situation of the vehicle, and third resilient means biasing the pawl in a direction of the flange, and the pawl is caused to engage with the flange by the third resilient means in accordance with the rotation of the flange by the worm through the first clutch means, whereby the winding-up of the second resilient means is accomplished.

13. A webbing tension device adapted for use in a webbing retractor for protecting an occupant in an emergency situation of a vehicle, which comprises:
   (a) a small spiral spring biasing a webbing takeup shaft supported rotatably to a frame fixed to a vehicle body and secured thereto with one end of an occupant restraining webbing weakly in a direction of a webbing retraction;
   (b) a large spiral spring biasing the takeup shaft strongly in the direction of the webbing retraction only in the emergency situation of the vehicle;
   (c) winding means including a worm wheel disposed coaxially with the takeup shaft and rotatably relative to the takeup shaft and a worm engaging with the worm wheel and rotating the worm wheel under reduction when the worm is rotated in one direction, the worm being provided with an operation portion rotatively operated by the occupant;
   (d) first clutch means transmitting the rotation in one direction of the worm to one end of the large spiral spring through the worm wheel against a biasing force of the large spiral spring, whereby the large spiral spring is wound up; and (e) trigger means actuating the large spiral spring in the emergency situation of the vehicle and preventing the worm from being further rotated when the wind-up of the large spiral spring is accomplished.

14. A webbing tension device as set forth in claim 13, which further comprises second clutch means transmitting the biasing force of the large spiral spring to the takeup shaft to rotate it in the direction of the webbing retraction in the emergency situation of the vehicle, whereby the webbing is retracted on the takeup shaft.

15. A webbing tension device as set forth in claim 14, wherein the first clutch means includes at least one first lever rotatably supported to the worm wheel and a first friction plate disposed coaxially with the worm wheel, and the first friction plate guides the first lever to cause it to engage with a gear wheel fixed to an operation wheel disposed coaxially with the takeup shaft and rotatably relative thereto, the operation wheel being secured with the one end of the large spiral spring, when the worm is rotated in the one direction, whereby the rotation of the worm is transmitted to the one end of the large spiral spring through the first clutch means.

16. A webbing tension device as set forth in claim 15, wherein the trigger means includes a pendulum which can swing in an emergency situation of the vehicle and a pawl put in its engaging position with the operation wheel in an ordinary situation of the vehicle and released from the operation wheel when the pendulum is swung in the emergency situation of the vehicle, whereby the large spiral spring is actuated to rotate the operation wheel.

17. A webbing tension device as set forth in claim 16, which further comprises a toothed wheel rotated in accordance with a rotation of the worm wheel and an oval cam fixed to the toothed wheel, the oval cam causing the pawl to engage with the operation wheel when the operation wheel is rotated in accordance with the rotation of the worm by a predetermined angle, whereby the winding-up of the large spiral spring is accomplished.

18. A webbing tension device as set forth in claim 14, wherein the first clutch means includes at least one pin received in a retainer disposed coaxially with the worm wheel and a serration groove formed opposite to the pin on an inner periphery of the worm wheel, a turn rod supporting an inner end of the large spiral spring is disposed coaxially with the takeup shaft, and the pin is pushed on to the turn rod by the serration groove when the worm wheel is rotated in one direction by the worm, whereby the worm wheel is put in its connected situation to the turn rod, so that the large spiral spring is wound up.

19. A webbing tension device as set forth in claim 18, wherein the second clutch means includes a clutch pin rotatably supported to a flange of the turn rod and a clutch plate rotatably supported to the takeup shaft, and the clutch plate guides the clutch pin to cause it to engage with a ratchet wheel fixed to the takeup shaft in the emergency situation of the vehicle, whereby the biasing force of the large spiral spring is transmitted to the takeup shaft.

20. A webbing tension device as set forth in claim 19, wherein the trigger means includes a pendulum swung in the emergency situation of the vehicle, a pawl put in its engaging situation with the flange of the turn rod in an ordinary situation of the vehicle and released from the flange when the pendulum is swung in the emergency situation of the vehicle and a coil spring biasing the pawl in a direction of the flange, and the pawl is caused to engage with the flange by the coil spring in accordance with the rotation of the flange by the worm through the first clutch means, whereby the winding-up of the large spiral spring is accomplished.

* * * * *